United States Patent [19]

Cipolli et al.

[11] Patent Number: 5,153,245
[45] Date of Patent: Oct. 6, 1992

[54] SELF-EXTINGUISHING POLYMERIC COMPOSITIONS

[75] Inventors: Roberto Cipolli, Novara; Gilberto Nucida, Milan; Enrico Masarati, Piacenza; Roberto Oriani; Mario Pirozzi, both of Milan, all of Italy

[73] Assignee: Ministero Dell'Universita' E Della Ricerca Scientifica E Tecnologica, Rome, Italy

[21] Appl. No.: 756,912

[22] Filed: Sep. 9, 1991

[30] Foreign Application Priority Data

Sep. 11, 1990 [IT] Italy ................. 21421 A/90

[51] Int. Cl.⁵ ............ C08K 5/3492; C08K 5/3432; C08K 5/357
[52] U.S. Cl. .................. 524/100; 524/91; 524/96; 524/415; 524/416
[58] Field of Search .............. 524/100, 415, 416, 96

[56] References Cited

U.S. PATENT DOCUMENTS 4,504,610  3/1985  Fiontanelli et al. .......... 524/100

FOREIGN PATENT DOCUMENTS 326082  8/1989  European Pat. Off. .

Primary Examiner—Paul R. Michl
Assistant Examiner—Tae H. Yoon
Attorney, Agent, or Firm—Oblon, Spivak, McClelland, Maier & Neustadt

[57] ABSTRACT

Polymeric compositions endowed with high characterics of self-extinguishing to flame based on thermoplastic polymers or having elastomeric properties, especially olefin polymers and copolymers, comprising:

a) from 91 to 40 parts by weight of a thermoplastic polymer or having elastomeric properties;
b) from 6 to 33 parts by weight of one or more phosphates and/or phosphonates of ammonium or of an amine;
c) from 3 to 27 parts by weight of one or more compounds derived from 2,4-diamino-6-hydroxy-1,3,5-triazine, having the general formula (I):

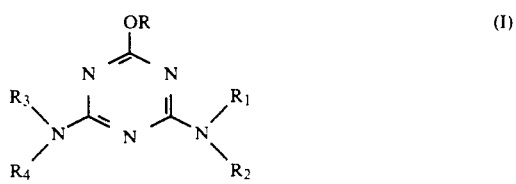

21 Claims, No Drawings

SELF-EXTINGUISHING POLYMERIC COMPOSITIONS

BACKGROUND OF THE INVENTION

1. Field of the Invention

The present invention relates to self-extinguishing compositions based on thermoplastic polymers or on polymers endowed with elastomeric properties, especially olefinic polymers and copolymers, containing particular triazinic compounds combined with phosphates and/or phosphonates of ammonium or of an amine.

2. Discussion of the Background

In the art there are known different solutions to reduce or remove the combustibility of polymers. Some of these solutions are based on the use of metal compounds, especially antimonium, bismuth or arsenic compounds, in combination with organic compounds partially halogenated and thermically unstable, such as chlorinated paraffinic waxes.

Other solutions are based on the use of substances able to produce intumescence. Formulations of intumescent type are generally consisting of the polymer and of at least three mainly additives: one essentially phosphorated, the purpose of which is to form during the combustion an impermeable, semisolid, vitreous layer, essentially consisting of polyphosphoric acid, and to activate the formation process of the intumescence, a second containing nitrogen which acts as foaming agent and a third containing carbon which acts as carbon donor to form an insulating cellular carbon layer (char) between the polymer and the flame.

Examples of intumescent formulations of this type are those reported in U.S. Pat. No. 3,810,862 (Phillips Petroleum Co.) consisting of melamine, pentaerhythritol and ammonium polyphosphate, U.S. Pat. No. 4,727,102 (Vamp s.r.l.) consisting of melamine cyanurate, an hydroxyalkylderivative of isocyanuric acid and ammonium polyphosphate, and in Published Patent Application WO 85/05626 (Plascoat U.K. Ltd.) consisting of different phosphorus and nitrogen compounds among which, in particular, a combination of melamine phosphate, pentaerhythritol and ammonium polyphosphate.

In more recent formulations, together with the use of an organic or inorganic phosphorus compound an organic compound has been used containing nitrogen, especially an aminoplastic resin obtained by condensing urea, melamine or dicyandiamide with formaldehyde.

Examples of formulations consisting of two additives are those reported in U.S. Pat. No. 4,504,610 (Montedison S.p.A.), consisting of oligomeric derivatives of 1,3,5-triazine and ammonium polyphosphate, and European Patent 14,463 (Montedison S.p.A.) consisting of organic compounds selected from benzylguanamine and reaction products between aldehydes and several nitrogenous cyclic compounds, in particular benzylguanamine-formaldehyde copolymers, and ammonium polyphosphate.

It is also possible to obtain self-extinguishing compositions using monocomponent additives, containing in the organic molecule both nitrogen and phosphorus, as described in U.S. Pat. No. 4,201,705 (Borg-Warner Corp.).

These intumescent retarding systems give the property of forming a carbon residue to the polymer containing them following a fire or application of a flame. Retarding systems of this type show many advantages: absence of corrosion phenomena in apparatus in which polymers are processed, lower emission of smokes in comparison with systems containing metal compounds and halogenated hydrocarbons and, in particular, the possibility of giving satisfactory antiflame properties to polymers using a lower quantity of total additive and therefore without an excessive decay of the mechanical properties of polymers themselves.

SUMMARY OF THE INVENTION

The Applicant have now found that it is possible to give very good anti-flame properties to the above mentioned polymers using a class of compounds derived from the 2,4-diamino-6-hydroxy-1,3,5-triazine, the effectiveness of which results to be superior also to that of the products known from the art.

More specifically the compositions of the present invention comprise:

a) from 91 to 40 parts by weight of a thermoplastic polymer or of a polymer having elastomeric properties;

b) from 6 to 33, preferably from 8 to 30, parts by weight of one or more phosphates and/or phosphonates of ammonium or of an amine;

c) from 3 to 27, preferably from 4 to 20, parts by weight of one or more compounds derived from the 2,4-diamino-6-hydroxy-1,3,5-triazine having the general formula (I):

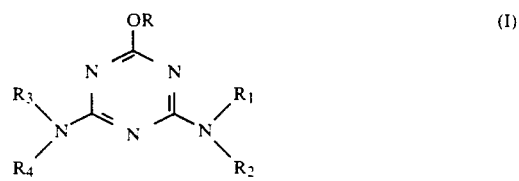

wherein:

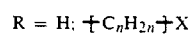

wherein n is an integer comprised between 1 and 8, preferably between 1 and 4;

X=H; CN; —O-($C_1$-$C_4$)-alkyl; O-($C_2$-$C_4$)-alkenyl; ($C_6$-$C_{12}$)-cycloalkyl or alkylcycloalkyl; O-($C_6$-$C_{12}$)-aryl; X is preferably hydrogen;

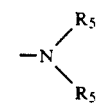

wherein radicals $R_5$, the same or different between them, are ($C_1$-$C_4$)-alkyl; ($C_3$-$C_4$)-alkenyl; or the group:

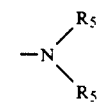

is replaced by a heterocyclic radical bound to the alkyl chain through the nitrogen atom, and optionally containing another hereoatom preferably selected among O, S, N; ($C_2$-$C_6$)-alkenyl; ($C_6$-$C_{12}$)- cycloalkyl or alkylcycloalkyl; (C$_6$-C$_{12}$)-aryl or aralkyl; at least one of radicals from R$_1$ to R$_4$ is:

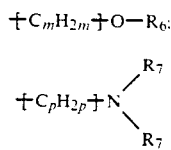

with:
m = integer comprised between 2 and 8, preferably between 2 and 4;
p = integer comprised between 2 and 6;
R$_6$=H; (C$_1$-C$_8$)-alkyl; preferably H or alkyl C$_1$-C$_4$; (C$_2$-C$_6$)-alkenyl;

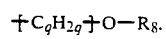

wherein q is an integer comprised between 1 and 4 and R$_8$ is hydrogen or (C$_1$-C$_4$)-alkyl; (C$_6$-C$_{12}$)-cycloalkyl or alkylcycloalkyl; radicals R$_7$, the same or different between them, are H; (C$_1$-C$_8$)-alkyl; (C$_2$-C$_6$)-alkenyl; (C$_1$-C$_4$)-hydroxyalkyl; (C$_6$-C$_{12}$)-cycloalkyl or alkylcycloalkyl; or the group:

is replaced by a heterocyclic radical bound to the alkyl chain through the nitrogen atom and optionally containing another heteroatom preferably selected from O, S, N;
or in the general formula (I) at least one of groups:

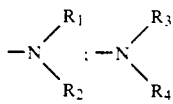

is replaced by a heterocyclic radical bound to the triazinic ring through the nitrogen atom and containing optionally another heteroatom preferably selected from O, S, N.

Other radicals from R$_1$ to R$_4$, equal or different between them, have the above mentioned meaning or are: H; (C$_1$-C$_{18}$)-alkyl; (C$_6$-C$_{16}$)-cycloalkyl or alkylcycloalkyl, optionally substituted by a hydroxy or (C$_1$-C$_4$)-hydroxyalkyl function.

DETAILED DESCRIPTION OF THE PREFERRED EMBODIMENTS

The above mentioned compounds of general formula (I), besides having a simple structure, in that are obtained by the insertion on the molecule of the 2,4-diamino-6-hydroxy-1,3,5-triazine, which however is unable to give self-extinguishing property to the above mentioned polymers, of a suitable substituent selected among those hereinafter described, are particularly stable to heating and therefore maintain a high activity of flame retarders also after working processes in warm of the polymeric compositions containing them.

Furthermore, the compositions object of the present invention show the advantage of giving, in the event of fire, a very poor and not darkening emission of smokes.

Examples of radical R in the general formula (I) are: methyl; ethyl; propyl; isopropyl; n-butyl; isobutyl; terbutyl; n-pentyl; isopentyl; n-hexyl; ter-hexyl; octyl; ter-octyl; ethenyl; propenyl; butenyl; isobutenyl; hexenyl; cyclohexyl; propylcyclohexyl; butylcycohexyl; phenyl; benzyl; 2-phenylethyl; cyanometyl; 2-cyanoethyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 5-ethoxypentyl; 2-cyclohexyloxyethyl; 2-ethenyloxyethyl; 2-phenoxyethyl; 2-(N,N-dimethylamino)ethyl; 3-(N,N-dimethylamino)propyl; 4-(N,N-dimethylamino)butyl; 5-(N,N-dimetylamino)pentyl; 6-(N,N-dimethylamino)hexyl; 2-(N,N-diethylamino)ethyl; 3-(N,N-diethylamino)propyl; 4-(N,N-diethylamino)butyl; 2-(N,N-dipropylamino)ethyl; 2-[N-methyl-N-(1-propenyl)amino]ethyl; 2-[N,N-di(1-propenyl)amino]ethyl; 4-[N,N-di(1-propenyl)amino]butyl; etc.

Examples of radicals from R$_1$ to R$_4$ are: methyl; ethyl; propyl; isopropyl; n-butyl; isobutyl; terbutyl; n-pentyl; isopentyl; n-hexyl; ter-hexyl; octyl; ter-octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylamino)ethyl; 3-(N,N-dimethylamino)propyl; 4-(N,N-dimethylamino)butyl; 5-(N,N-dimethylamino)pentyl; 4-(N,N-diethylamino)butyl; 5-(N,N-diethylamino)pentyl; 5-(N,N-diidropropylamino)pentyl; 3-(N-ethylamino)propyl; 4-(N-methylamino)butyl; 4-(N,N-dipropylamino)butyl; 2-(N,N-diisopropylamino)ethyl; 6-(N-hexenylamino)hexyl; 2-(N-ethenylamino)ethyl; 2-(N-cyclohexylamino)ethyl; 2-(N-hydroxyethylamino)ethyl; 2-(2-hydroxyethoxy)ethyl; 2-(2-methoxyethoxy)ethyl; 6-(N-propylamino)hexyl; etc.

Examples of heterocyclic radical which may replace groups:

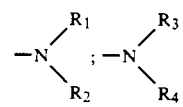

in the general formula (II) are: aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine; etc.

Examples of heterocyclic radical which may replace the group:

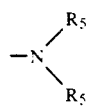

are: pyrrolidine; piperidine; morpholine; thiomorpholine; piperazine; 4-methylpiperazine; 4-ethylpiperazine; etc.

Examples of heterocyclic radical which may replace the group:

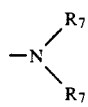

are: aziridine, pyrrolidine; piperidine; morpholine; thiomorpholine; piperazine; 4-methylpiperazine; 4-ethylpiperazine; etc.

Particularly preferred are the compounds of general formula (I) wherein R is hydrogen.

Compounds of general formula (I) can be prepared from the intermediates of general formula (II):

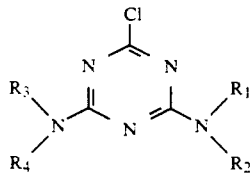

wherein radicals from $R_1$ to $R_4$ have the previously defined meaning, according to the following modalities:
 a) when R is hydrogen by hydrolysis either with an acid (such as for instance hydrochloric acid, hydrobromic acid, sulfuric acid, phosphoric acid, etc.) at temperatures comprised between 60° and 100° C., or with a base (such as for instance sodium hydroxide, potassium hydroxide, etc.), at temperatures comprised between 100° and 180° C.;
 b) when R is different from hydrogen by condensation reaction with a reactive of general formula (III):

R—OH (III)

wherein R has the previously defined meaning, in a solvent (such as for instance toluene, xylene, orthodichlorobenzene, etc.) or in excess of reactive (III) if it may act as solvent (such as for instance methyl alcohol, ethyl alcohol, etc.) in the presence of a base (such as for instance sodium hydroxide, potassium hydroxide, metal sodium, etc.) at temperatures comprised between 60° and 150° C.

The product formed can be easily separated from the reaction mass by filtration.

Generally products of general formula (I) are obtained, having a good quality, in form of white crystalline powder, useable in self-extinguishing compositions without any further purification.

Intermediates of general formula (II) can be easily synthetized by allowing to react a halide of the cyanuric acid, for instance, the chloride, at a temperature comprised between 0° and 10° C., in a solvent (such as for instance, acetone, water, methylene chloride, etc.) with an amine of general formula (IV):

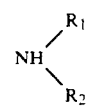

wherein $R_1$ and $R_2$ have the previously defined meaning, in the presence or not (according to the molar ratio used) of an acidity acceptor (such as for instance NaOH, NaHCO$_3$, Na$_2$CO$_3$, triethylamine, etc.) thus obtaining the intermediate of general formula (V):

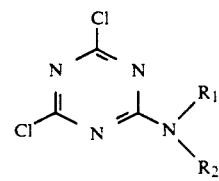

This intermediate, either separated or not, is then allowed to react under conditions analogous to the preceding ones, but working at higher temperature, for instance between 10° and 50° C., with an amine of general formula (VI):

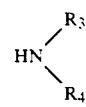

wherein $R_3$ and $R_4$ have the previously defined meaning.

In the event that it is desired to obtain derivatives of the general formula (I) wherein groups:

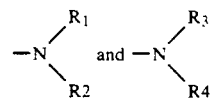

are equal between them, one mol of the halide of cyanuric acid is allowed to react with two mols, if in the presence of an acidity acceptor or with four mols if in the absence of the acidity acceptor, of an amine of the general formula (IV) under working conditions analogous to those previously described.

An alternative method for obtaining compounds of the general formula (I), wherein R is different from hydrogen, consists in allowing the a halide of cyanuric acid, for instance the chloride, to react with a derivative of general formula (III), at temperature comprised between 10° and 110° C., in a suitable solvent (such as for instance, acetone, methylene chloride, toluene, xylene etc.) or in an excess of the reagent of general formula (III) if it has solvent characteristics (such as methyl alcohol, ethyl alcohol, etc.) in the presence of an acidity acceptor (such as for instance NaHCO$_3$, Na$_2$CO$_3$, NaOH, triethylamine, collidine, etc.) thus obtaining the intermediate of general formula (VII):

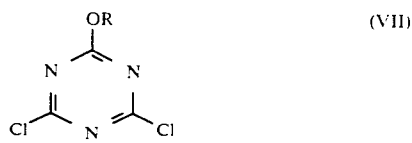

wherein R has the previously defined meaning.

This intermediate, either separated or not, is allowed to react with an amine of general formula (IV) under conditions analogous to the preceding ones, but at temperatures comprised between −5° and 30° C., to give the intermediate of general formula (VIII):

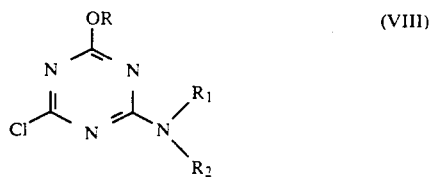

wherein R, $R_1$ and $R_2$ have the previously defined meaning.

This intermediate, either separated or not, is allowed to react again under conditions analogous to the preceding ones, by working at higher temperature, for instance from 40° to 120° C., and therefore using a solvent compatible also with these temperatures (such as for instance, water, toluene, xylene, etc.) with an amine of general formula (VI) thus obtaining finally compounds of general formula (I).

In the event that compounds of general formula (I) are desired wherein R is different also in this case from hydrogen, and groups:

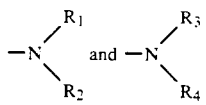

are equal between them, one mol of the intermediate of general formula (VII) is allowed to react with two mols, if in the presence of an acidity acceptor, or with four mols, if in absence, of an amine of general formula (IV) under conditions analogous to those previously described.

From compounds of general formula (I) wherein R is different from hydrogen, and is preferably ($C_1$-$C_4$)-alkyl, it is possible to obtain derivatives of general formula (I) wherein R is equal to hydrogen, by hydrolysis reaction either with an acid, by working at temperatures comprised between 80° and 140° C., or with a base, by working at temperatures comprised between 100° and 180° C., using the same reagents indicated for the hydrolysis of intermediates of general formula (II).

Among phosphates ammonium polyphosphates are preferred which are comprised in the general formula $(NH_4)_{n+2}P_nO_{3n+1}$ wherein n represents an integer equal or higher than 2; preferably the molecular weight of polyphosphates must be enough high to secure a low water solubility. As example, n varies preferably between 2 and 500.

The composition of polyphosphates having the above specified formula, wherein n is a number enough great and preferably comprised between 5 and 500, is practically that corresponding to the formula of metaphosphates $(NH_4PO_3)_n$.

An example of these polyphosphates is that known under the trade name "EXOLIT 422" (manufactured and sold by Hoechst Society) and having the composition $(NH_4PO_3)_n$ wherein n is higher than 50; another example is the product known under the trademark "PHOS-CHEK P/30" (Monsanto Chemical) and having analogous composition.

Another polyphosphate which can be advantageously used expecially because the reduced water solubility is that known under the trade name "EXOLIT 462" (manufactured and sold by Hoechst) and corresponding to EXOLIT 422 microincapsulated in melamina-formaldehyde resin.

Other useable phosphates are those deriving from amines, such as for instance dimethylammonium phosphate or diethylammonium phosphate, ethylendiamine phosphate, melamine ortho or pyrophosphate.

Among phosphonates very good results are obtained when ammonium phosphonates (mono or poly substituted) derived from mono or polyphosphonic acids are used. Examples of these phosphonates are: ethane-1,1,2-triphosphonic acid; 2-hydroxyethane-1,1,2-triphosphonic acid; propane-1,2,3-triphosphonic acid; methylphosphonic acid; ethylphosphonic acid; n-propylphosphonic acid; n-butylphosphonic acid; phenylphosphonic acid; 1-aminoethane-1,1-diphosphonic acid; 1-hydroxyethane-1,1-diphosphonic acid; 1-hydroxydodecane-1,1-diphosphonic acid, phosphonoacetic acid; 2-phosphonopropionic acid; 3-phosphonopropionic acid; 2-phosphonobutyric acid; 4-phosphonobutyric acid; aminotris(methylenphosphonic) acid; ethylendiaminotetra(methylenphosphonic) acid; hexamethylendiaminotetra(methylenphosphonic) acid; diethylentriaminopenta(methylenphosphonic) acid; etc.

Among polymers useable in compositions of the present invention olefine polymers or copolymers are preferred having general formula $R-CH=CH_2$ wherein R is a hydrogen atom or a ($C_1$-$C_8$)-alkyl or ($C_1$-$C_8$)-aryl radical, in particular:

1) isotactic or prevailingly isotactic polypropylene;
2) HDPE, LLDPE, LDPE polyethylene;
3) crystalline propylene copolymers with lower proportions of ethylene and/or other alpha-olefins, such as for instance 1-butene, 1-hexene, 1-octene, 4-methyl-1-pentene;
4) heterophasic compositions comprising (A) a homopolymeric fraction of propylene or one of copolymers specified under (3) and (B) a copolymeric fraction consisting of elastomeric copolymers of ethylene with an alpha-olefin, optionally containing lower proportion of diene, wherein the alpha-olefin is preferably selected from propylene and 1-butene;
5) elastomeric copolymers of ethylene with alpha-olefins optionally containing lower proportions of a diene.

Examples of dienes among those more commonly present in the above mentioned elastomeric copolymers are butadiene, ethylidene-norbornene, hexadiene-1,4.

Among polymers of olefins of the general formula $R-CH=CH_2$ wherein R is an aryl radical, "crystal" and antishock polystyrene are preferred.

Other examples of commonly useable polymers are the ABS and SAN copolymers; the polyurethane (polyester and polyether); the polyethylenterephthalate; the polybutylenterephthalate; polyamides; etc.

Self-extinguishing compositions of the present invention can be prepared according to known methods: for instance the phosphate and/or the phosphonate of ammonium or of an amine are first intimately mixed with one or more nitrogenous compounds of the general formula (I) finely milled (preferably with particle sized lower than 70 microns) and the thus obtained mixture is added to the polymer in a turbomixer to form a homogeneous blend which is extruded and granulated. The granulated product thus obtained can be transformed in different articles according to anyone of known moulding techniques.

Antiflame additives of the present invention can be used also in the field of antifire paints.

Amelinic compounds comprised in the general formula (I), besides those exemplified, which can be advantageously used in polymeric compositions of the present invention are those listed in Table 1.

TABLE 1

| Products | R | $R_1-N-R_2$ | | $R_3-N-R_4$ | |
|---|---|---|---|---|---|
| 1 | H | (N–S ring, thiomorpholine) | | H | H |
| 2 | $C_2H_5$ | $CH_2CHOH\text{-}CH_3$ | H | H | H |
| 3 | $CH_3$ | (N–O ring, morpholine) | | $C_2H_5$ | H |
| 4 | $CH_3$ | $CH_2CH_2OH$ | $C_2H_5$ | H | H |
| 5 | cyclohexyl | (N–O ring, morpholine) | | H | H |
| 6 | H | $CH_2CH_2OH$ | H | cyclohexyl | H |
| 7 | $CH_2$–phenyl | $CH_2CH_2OCH_3$ | H | $CH_2CH_2OCH_3$ | H |
| 8 | $CH_2CH_2CN$ | $CH_2CH_2OH$ | H | $CH_2CH_2CH_2OH$ | H |
| 9 | $CH_3$ | (N–O ring, morpholine) | | (N–O ring, morpholine) | |
| 10 | $CH_3$ | (N ring, piperidine) | | H | H |
| 11 | | $(CH_2)_3OC_2H_5$ | H | $(CH_2)_3OC_2H_5$ | H |
| 12 | $C_2H_5$ | $CH_2CHOH\text{-}CH_3$ | H | $CH_2CHOH\text{-}CH_3$ | H |
| 13 | n-$C_4H_9$ | $CH_2CHOH\text{-}CH_3$ | H | H | H |
| 14 | $CH_3$ | $(CH_2)_3OCH_3$ | H | $(CH_2)_3OCH_3$ | H |
| 15 | $CH_2CH_2N(CH_3)_2$ | $CH_2CH_2OH$ | H | $CH_2CH_2OH$ | H |
| 16 | H | (N–NH ring, piperazine) | | (N–NH ring, piperazine) | |

TABLE 1-continued

| Products | R | $R_1$—N—$R_2$ | | $R_3$—N—$R_4$ | |
|---|---|---|---|---|---|
| 17 | H | $CH_2CH_2OH$ | $CH_2CH_2OH$ | H | H |
| 18 | H | $(CH_2)_4OCH_3$ | H | $(CH_2)_4OCH_3$ | H |
| 19 | $C_2H_5$ | $CH_2CH_2CH_2N\langle\rangle$ | H | H | H |
| 20 | $CH_3$ | $CH_2$—C(CH$_3$)=$CH_2$ | H | H | H |
| 21 | $CH_2CH_2OCH_3$ | $CH_2CH_2OH$ | H | $\langle N\ O\rangle$ | |
| 22 | H | $(CH_2)_2O(CH_2)_2OH$ | H | $(CH_2)_2O(CH_2)_2OH$ | H |

EXAMPLES

Examples reported hereinbelow illustrate the characteristics of the invention without limiting them in any way.

EXAMPLE 1

Into a 2 liters reactor equipped with stirrer, thermometer, dropping funnel, condenser and heating bath, there are introduced 184.5 g of cyanuric acid chloride and 1300 cc of methylene chloride.

By cooling from the outside, 87.2 g of morpholine and 40 g of sodium hydroxide dissolved in 150 g of water are fed contemporarily, within 3 hours, by keeping the pH comprised between 5 and 7 and the temperature comprised between 0° and 3° C.

The mixture is kept at the temperature of 0°-3° C. for further 3 hours and thereafter the aqueous phase is separated.

By distillation of the methylene chloride 230 g of the intermediate (IX):

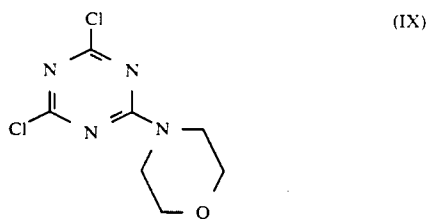
(IX)

are obtained in form of white crystalline powder having m.p.=155°-157° C. (m.p.=melting point) and a chlorine content equal to 30.12% (theor.=30.12%).

In 1 liter reactor, equipped with stirrer, thermometer, feeding funnel, cooler and heating bath, there are introduced 300 cc of water, 30.5 g of 2-hydroxyethylamine and, while agitating, 117.5 g of the intermediate (IX).

The temperature is gradually raised to 40° C.; after 30 minutes the whole is heated at 45° C. and is kept at this temperature for about 3 hours.

The temperature is raised again to 50° C. and within 3 hours a solution consisting of 20 g of sodium hydroxide dissolved in 100 cc of water is added.

The whole is kept for further 2 hours at 50° C. and thereafter is heated to 70° C. and is allowed to further react at this new temperature for 30 minutes.

After cooling to room temperature, the product formed is filtered off and washed on the filter with water.

After drying of the cake in oven at 100° C., 120.3 g of the intermediate (X):

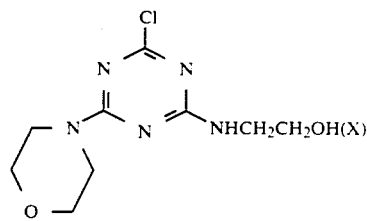

are obtained in form of white crystalline powder the m.p. of which is 172°-173° C. and the chlorine content is equal to 13.51% (theor.:13.68%).

The structure of intermediates (IX) and (X) has been further confirmed by spectroscopic IR analysis.

In the same 1 liter reactor there are fed 500 cc of water, 103.8 g of the intermediate (X) and 79 g of a 37% by weight solution of hydrochloric acid.

The mass is heated to 90° C. and is kept at this temperature for 3 hours.

The solution is then cooled to 50° C. and is neutralized by adding 48 g of sodium hydroxide dissolved in 80 cc of water.

By drying the cake in oven at 100° C. 84.7 g of the product:

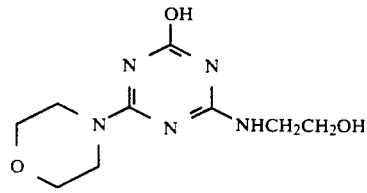

are obtained in form of white crystalline powder; m.p.=251°-253° C.

EXAMPLE 2

Into a 2 liters reactor, equipped as in example 1, 800 cc of methyl alcohol, 100 cc of water and 151.2 g of sodium bicarbonate are fed.

The mixture is cooled to 10° C. and then 166 g of the cyanuric acid chloride are introduced.

The temperature is allowed to raise up to 30° C. and is kept at this value for about 1 hour, until the carbon dioxide release is ended. The exothermy itself of the reaction is enough to keep the desired temperature.

The whole is cooled to 5° C. and thereafter 800 cc of cold water are added. The product formed is filtered off and washed on the filter with cold water.

By drying the cake in oven under vacuum at 60° C., 123.8 g of the intermediate (XI):

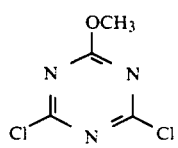
(XI)

are obtained in form of white crystalline powder; m.p.=90°-92° C.; chlorine content equal to 39.27% (theor. 39.44%).

In a 1 liter reactor, equipped as in example 1, 400 cc of water and 108 g of the intermediate (XI) are introduced.

After having cooled from the outside to 0°-5° C., 100 g of a 30% by weight ammonia solution are fed within about 1 hour while keeping the temperature at 0°-5° C. The temperature is allowed to raise spontaneously to room temperature and this value is maintained for 2 hours.

The whole is cooled to 10° C., the product formed is filtered off and washed with cold water. By drying the cake in oven at 100° C., 82.3 g of the intermediate (XII):

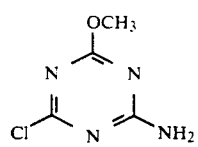
(XII)

are obtained in form of white crystalline powder; m.p. higher than 300° C.; chlorine content equal to 21.96% (theor.: 22.12%).

The structure of intermediates (XI) and (XII) was further confirmed by NMR analysis.

In the same 1 liter apparatus, but provided with heating bath, 300 cc of toluene, 80.2 g of the intermediate (XII) and 90 g of morpholine are fed.

The whole is heated to 60°-65° C. and is kept at this temperature for 2 hours; thereafter the mixture is heated to boiling and is kept under reflux for 1 hour.

After having allowed the mixture to cool to room temperature, the product formed is separated by filtration.

The cake is abundantly washed with water and, after drying, 90.3 g of the product:

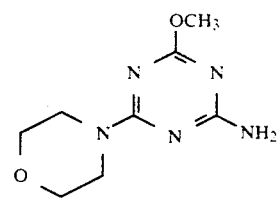

are obtained in form of white crystalline powder; m.p.=182°-184° C.

EXAMPLE 3

In a 1 liter reactor, equipped as in example 2, 400 cc of water, 63.3 g of the product of example 2 as well as 59.1 g of a 37% by weight hydrochloric acid solution are fed.

The mixture is heated to boiling and is kept under reflux for 2 hours.

After cooling to 80° C., 24 g of sodium hydroxide dissolved in 100 cc of water are added.

The whole is allowed to cool to room temperature, then the product formed is filtered off and washed on the filter with water.

By drying the cake in oven at 100° C., 54.7 g of the product:

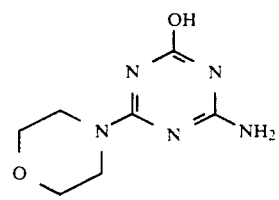

are obtained in form of white crystalline powder; m.p. higher than 300° C.

EXAMPLE 4

600 cc of water and 184.5 g of the cyanuric acid chloride are fed in a 2 liters reactor equipped as in example 1.

By cooling from the outside to 2° C., 122.5 g of 2-hydroxyethylamine in 100 cc of water are fed within 2 hours; during the addition the temperature is allowed to gradually raise up to 5°-7° C.

The temperature is raised to 20° C. and is kept at this value for 1 hour; then the whole is heated to 35°-40° C. and 80 g of sodium hydroxide dissolved in 200 cc of water are added within about 3 hours.

The reaction mass is heated to 60° C. and is kept at this temperature for 2 hours.

The reaction mass is cooled to room temperature, the product formed is filtered off and washed on the filter with water.

By drying the cake in oven at 100° C., 203.1 g of the intermediate (XIII):

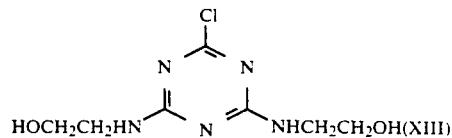
(XIII)

are obtained in form of white crystalline powder; m.p.=188°-190° C.; chlorine content equal to 15.33% (theor. 15.20%).

The structure of the intermediate (XIII) has been further confirmed by IR spectroscopic analysis.

400 cc of water, 13 g of sodium hydroxide and 70.1 g of the intermediate (XIII) are fed in a 1 liter stainless reactor equipped as in example 1.

The mixture is then heated to 150° C. and is kept at this temperature for about 10 hours.

The whole is cooled to room temperature, the product formed is filtered and washed on the filter with water. By drying the cake in oven at 100° C., 57.7 of the product:

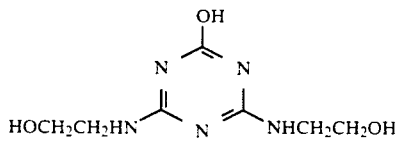

are obtained in form of white crystalline powder; m.p. higher than 300° C.

EXAMPLE 5

1000 cc of methylene chloride, 129.1 g of cyanuric acid chloride and 51.2 g of t.butyl amine are fed in the same 2 liters apparatus of example 1.

By working then as described in example 1, after having distilled the solvent, 148 g of the intermediate (XIV):

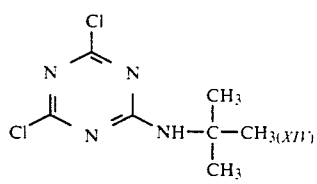

are obtained in form of white crystalline powder; m.p.=129°-130° C.; chlorine content equal to 31.87% (theor. 32.13%).

500 cc of chloroform, 110.5 g of the intermediate (XIV) and 30.5 g of 2-hydroxyethylamine dissolved in 80 cc of water are fed in a 1 liter reactor equipped as in the preceding examples.

The mixture is heated to boiling and kept under reflux for 3 hours; thereafter, a solution consisting of 20 g of sodium hydroxide in 70 cc of water is fed within 2 hours.

The mixture is kept for further 1 hour to boiling and then is cooled to room temperature by separating the organic phase.

The solvent is distilled off and the product which remains after the distillation is treated with 500 cc of water in the same 1 liter reactor.

The product is heated to 50°-60° C. until a good dispersion is obtained and thereafter the whole is cooled to room temperature and the product formed is separated by filtration.

The cake is washed with water and dried in oven at 80° C. 106.7 g of the intermediate (XV):

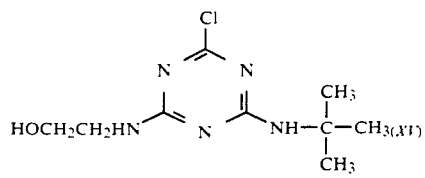

are obtained in form of white crystalline powder; m.p.=134°-135° C.; chlorine content equal to 14.32% (theor. 14.4%).

The structure of intermediates (XIV) and (XV) has been further confirmed by NMR analysis.

500 cc of water, 98.2 g of the intermediate (XV) and 20.5 g of 96% by weight sulfuric acid are fed in the same 1 liter reactor.

The reaction mass is heated to 85° C. and is kept at this temperature for 2 hours.

Thereafter, 32 g of sodium hydroxide dissolved in 100 cc of water are fed within 30 minutes.

The whole is kept for further 30 minutes at 85° C. and thereafter is cooled to room temperature; the product formed is filtered and washed on the filter.

By drying the cake in oven at 100° C., 83.2 g of the product:

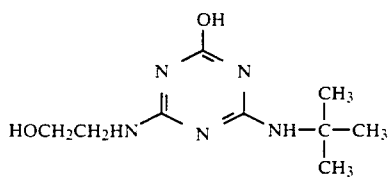

are obtained in form of white crystalline powder; m.p. higher than 300° C.

EXAMPLE 6

600 cc of water and 184.5 g of the cyanuric acid chloride are introduced in a 2 litres reactor, equipped as in example 1.

While cooling from the outside to 0°-2° C., 75 g of 2-methoxyethylamine are fed within 1 hour and 30 minutes.

Subsequently, 40 g of sodium hydroxide dissolved in 250 cc of water are fed within 2 hours, always maintaining the temperature at 0°-2° C.

The mass is kept under agitation for further 1 hour at the same temperature, then the product formed is separated by filtration and washed on the filter with water.

By drying in oven under vacuum at 60° C., 178.9 g of the intermediate (XVI):

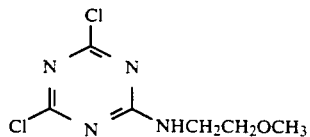

(XVI)

are obtained in form of white crystalline powder; m.p.=73°-75° C.; chlorine content equal to 31.68% (theor. 31.84%).

In a 1 liter reactor equipped as in example 1, there are introduced 85 g of a 30% by weight ammonia solution, 250 cc of water and 111.5 g of the intermediate (XVI).

The mixture is first heated to 40° C. keeping this temperature for 4 hours, then to 55° C. for 2 hours.

The mass is cooled to 10° C. and the product formed is filtered and washed on the filter with water.

By drying the cake in oven at 100° C. 98 g of the intermediate (XVII):

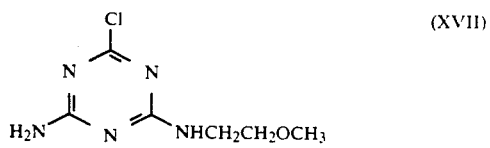

are obtained in form of white crystalline powder; m.p.=195°-197° C.; chlorine content equal to 17.21% (theor. 17.44%).

The structure of intermediates (XVI) and (XVII) has been further confirmed by IR spectroscopic analysis.

400 cc of water, 81.4 g of the intermediate (XVII) and 42.3 g of 37% by weight hydrochloric acid are introduced in the same 1 liter reactor.

The mixture is heated to 80° C. and is kept at this temperature for 2 hours.

Thereafter, 44.2 g of sodium carbonate dissolved in 200 cc of water are added, always at 80° C.

The whole is then cooled to room temperature and the product formed is filtered and washed on the filter with water.

By drying the cake in oven at 100° C., 68.1 g of the product:

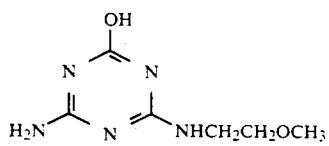

are obtained in form of white crystalline powder having a melting point higher than 300° C.

EXAMPLE 7

400 cc of methyl alcohol are introduced in a 1 liter reactor equipped as in the preceding examples and, while keeping the temperature at 15°-20° C., 17.6 g of sodium hydroxide are added.

The mixture is kept under agitation until the solution is completed, thereafter 103.8 g of the intermediate (X) are introduced.

The mixture is heated to boiling and is kept under reflux for 4 hours.

Then the most part of the solvent (about 350 cc) are distilled off and the residue of the distillation is treated with 200 cc of water.

The product formed is filtered and washed on the filter with water.

By drying the cake in oven at 100° C. 88.7 g of the product:

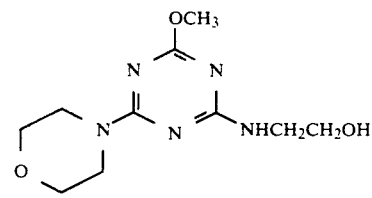

are obtained in form of white crystalline powder; m.p.=136°-138° C.

EXAMPLES 8-24

By working under conditions analogous to those described in examples from 1 to 7, product of general formula (I) listed in Table 2 are prepared.

TABLE 2

| EX. No. | R | $R_1-N-R_2$ | | $R_3-N-R_4$ | | m.p. (°C.) |
|---|---|---|---|---|---|---|
| 8 | H | (CH$_2$)$_3$OH | H | (CH$_2$)$_3$OH | H | >300 |
| 9 | H | CH$_2$CH$_2$OH | H | CH$_2$—CH=CH$_2$ | H | >300 |
| 10 | H | CH$_2$CH$_2$OCH$_3$ | H | CH$_2$CH$_2$OCH$_3$ | H | >300 |
| 11 | H | N⌒NH (piperazine) | | H | H | >300 |
| 12 | H | CH$_2$CH$_2$OH | CH$_3$ | CH$_2$CH$_2$OH | CH$_3$ | 207-209 |
| 13 | H | (CH$_2$)$_5$OH | H | H | H | 254-257 |
| 14 | H | N⌒O (morpholine) | | N⌒O (morpholine) | | >300 |
| 15 | n-C$_4$H$_9$ | N⌒O (morpholine) | | H | H | 109-113 |
| 16 | H | CH$_2$CHOH–CH$_3$ | H | CH$_2$CHOH–CH$_3$ | H | >300 |

TABLE 2-continued

| EX. No. | R | $R_1-N-R_2$ | | $R_3-N-R_4$ | | m.p. (°C.) |
|---|---|---|---|---|---|---|
| 17 | phenyl | CH₂CH₂OH | H | CH₂CH₂OH | H | 238–242 |
| 18 | H | CH₂CH₂OH | CH₂CH₂OH | CH₂CH₂OH | CH₂CH₂OH | 200–203 |
| 19 | H | CH₂CH₂CH₂N(morpholino) | H | H | H | >300 |
| 20 | CH₂—CH=CH₂ | N(morpholino) | | H | H | 149–152 |
| 21 | H | CH₂CH₂OCH₃ | H | CH₂CH₂OH | H | 250–253 |
| 22 | CH₂CH₂N(morpholino) | CH₂CH₂OH | H | CH₂CH₂OH | H | 227–231 |
| 23 | H | CH₂CH₂OCH=CH₂ | H | H | H | >300 |
| 24 | H | CH₂CH₂OH | H | N(piperidino) | | >300 |

TABLES 3 and 4

Tests reported in the above specified tables relates to compositions containing products of general formula (I) prepared according to the preceding examples.

Specimens in form of little plates having 3 mm thickness have been prepared by molding the mixtures of granulated polymer and additives in a MOORE plate press, by working for 7 minutes at a pressure of 40 kg/cm².

On the thus obtained plates the self-extinguishing level has been determined by measuring the oxygen index (L.O.I. according to ASTM D-2863/77) in a Stanton Redcroft apparatus and applying the "Vertical Burning Test" which allows to classify the material at three levels 94V-0, 94V-1 and 94V-2 according to rules UL 94 (edited by "Underwriters Laboratories" USA).

In Table 3 values obtained using an isotactic polypropylene in flakes having a Melt Flow Index equal to 12 and a fraction insoluble in boiling n-heptane equal to 96% by weight are reported.

In table 4 values are reported obtained using a low density polyethylene in granules, having a Melt Flow Index equal to 7; a polystyrene in granules containing 5% by weight of butadiene rubber and having Melt Flow Index equal to 9; a thermoplastic polyurethane either polyester (ESTANE 54600 ® by Goodrich) or polyether (ESTANE 58300 ® by Goodrich) in granules having specific gravity equal to 1.19 and 1.10 g/cm³ respectively; an elastomeric ethylene-propylene copolymer having a propylene by weight percentage content equal to 45; an acrylonitrile-butadiene-styrene terpolymer having specific gravity equal to 1.06 g/cm³, Melt Flow Index equal to 1.6 and containing about 40% of acrylonitrile and styrene and 20% of butadiene.

TABLE 3

| Ex- ample No. | Product Example No. | PARTS BY WEIGHT | | | | L.O.I. (ASTM D2863) | UL 94 3 mm |
|---|---|---|---|---|---|---|---|
| | | Pro- duct | PP (1) | AO (2) | APP (1) | | |
| 25 | 1 | 7.4 | 73 | 1 | 18.6 | 33.8 | V0 |
| 26 | 2 | 8.3 | 70 | 1 | 20.7 | 34.6 | V0 |
| 27 | 3 | 16.0 | 75 | 1 | 8.0 | 29.5 | V1 |
| 28 | 4 | 4.2 | 78 | 1 | 16.8 | 31.8 | V0 |
| 29 | 5 | 6.9 | 75 | 1 | 17.1 | 31.4 | V1 |
| 30 | 6 | 8.0 | 75 | 1 | 16.0 | 33.3 | V0 |
| 31 | 7 | 8.3 | 70 | 1 | 20.7 | 34.7 | V0 |
| 32 | 8 | 7.2 | 70 | 1 | 21.8 | 37.1 | V0 |
| 33 | 9 | 8.3 | 70 | 1 | 20.7 | 33.8 | V0 |
| 34 | 10 | 7.2 | 70 | 1 | 21.8 | 36.5 | V0 |
| 35 | 11 | 6.9 | 75 | 1 | 17.1 | 30.8 | V0 |
| 36 | 12 | 6.8 | 75 | 1 | 17.2 | 31.4 | V0 |
| 37 | 13 | 9.7 | 70 | 1 | 19.4 | 32.1 | V1 |
| 38 | 14 | 6.8 | 75 | 1 | 17.2 | 34.6 | V0 |
| 39 | 15 | 8.3 | 70 | 1 | 20.7 | 31.8 | V1 |
| 40 | 16 | 6.0 | 75 | 1 | 18.0 | 34.7 | V0 |
| 41 | 17 | 8.3 | 70 | 1 | 20.7 | 32.3 | V1 |
| 42 | 18 | 6.0 | 75 | 1 | 18.0 | 34.3 | V0 |
| 43 | 19 | 12.0 | 75 | 1 | 12.0 | 31.3 | V0 |
| 44 | 20 | 8.3 | 70 | 1 | 20.7 | 32.4 | V0 |
| 45 | 21 | 6.8 | 75 | 1 | 17.2 | 32.7 | V0 |
| 46 | 22 | 8.3 | 70 | 1 | 20.7 | 34.7 | V0 |
| 47 | 23 | 8.0 | 75 | 1 | 16.0 | 33.6 | V0 |
| 48 | 24 | 7.2 | 70 | 1 | 21.8 | 32.9 | V0 |
| 49 | 3 | 8.0 | 75 | 1 | 16.0* | 31.5 | V0 |
| 50 | 6 | 6.0 | 75 | 1 | 18.0* | 34.1 | V0 |
| 51 | 4 | 6.0 | 75 | 1 | 18.0(3) | 30.5 | V0 |

TABLE 3-continued

| Example No. | Product Example No. | PARTS BY WEIGHT Product | PP (1) | AO (2) | APP (1) | L.O.I. (ASTM D2863) | UL 94 3 mm |
|---|---|---|---|---|---|---|---|
| 52 | 16 | 6.8 | 75 | 1 | 17,2(4) | 31.8 | V0 |

(1) PP = polypropylene
APP = ammonium polyphosphate EXOLIT 422 ® (Hoechst)
*APP = microincapsulated with melamine-formaldehyde resin EXOLIT 462 ® (Hoechst)
(2) AO = antioxidant
Mixture consisting of two parts of dilaurylthiopropionate and 1 part of tetra[3-(3,5-di-terbutyl-4-hydroxyphenyl)propionate] of pentaerythritol.
(3) monoammonium salt from 1-aminoethane-1,1-diphosphonic acid
(4) monammonium salt from 1-hydroxyethane-1,1-diphosphonic acid.

TABLE 4

| Ex. No. | Supp. Polymeric (1) (1) | Product Example No | PARTS BY WEIGHT Polymer | Product | AO (2) | APP (1) | L.O.I. (ASTM-D2863) | UL94 3 mm |
|---|---|---|---|---|---|---|---|---|
| 53 | LDPE | 1 | 70 | 7,2 | 1 | 21,8 | 30,0 | V1 |
| 54 |  | 4 | 65 | 8,5 | 1 | 25,5 | 35,7 | V0 |
| 55 |  | 16 | 60 | 9,0 | 1 | 30,0 | 40,7 | V0 |
| 56 |  | 18 | 65 | 8,5 | 1 | 25,5 | 32,1 | V1 |
| 57 | HIPS | 3 | 65 | 11,3 | 1 | 22,7 | 29,2 | V1 |
| 58 |  | 4 | 65 | 13,6 | 1 | 20,4 | 32,7 | V0 |
| 59 |  | 8 | 65 | 11,3 | 1 | 22,7 | 31,5 | V1 |
| 60 |  | 16 | 65 | 8,5 | 1 | 25,5 | 30,5 | V0 |
| 61 |  | 18 | 63 | 12,0 | 1 | 24,0 | 31,8 | V0 |
| 62 |  | 4 | 64 | 8,8 | 1 | 26,2(3) | 29,8 | V0 |
| 63 | PU | 1 | 70 | 7,2 | 1 | 21,8 | 33,8 | V0 |
| 64 | (estere) | 3 | 70 | 7,2 | 1 | 21,8 | 35,2 | V0 |
| 65 |  | 4 | 70 | 8,3 | 1 | 20,7 | 36,1 | V0 |
| 66 |  | 10 | 70 | 7,2 | 1 | 21,8 | 34,4 | V0 |
| 67 |  | 16 | 70 | 8,3 | 1 | 20,7 | 34,5 | V0 |
| 68 | PU etere | 3 | 65 | 8,5 | 1 | 25,5 | 28,9 | V0 |
| 69 | PP/PE | 1 | 65 | 8,5 | 1 | 25,5 | 30,4 | V1 |
| 70 |  | 4 | 65 | 9,7 | 1 | 24,3 | 32,5 | V0 |
| 71 |  | 16 | 65 | 8,5 | 1 | 25,5 | 30,8 | V0 |
| 72 | ABS | 4 | 65 | 13,6 | 1 | 20,4 | 29,7 | V0 |
| 73 |  | 16 | 65 | 13,6 | 1 | 20,4 | 28,5 | V0 |

(1) APP = ammonium polyphosphate- EXOLIT 422 ® (Hoechst)
LDPE = low density polyethylene
HIPS = polystyrene containing 5% of butadiene rubber
PU (ester) = polyurethane polyester
PU(ether) = polyurethane polyether
PP/PE = propylene-ethylene copolymer
ABS = acrylonitrile-butadiene-styrene terpolymer
(2) AO = antioxidant
Mixture consisting of 2 parts of dilaurylthiopropionate and 1 part of tetra [3-(3,5-di-terbutyl-4-hydroxyphenyl)propionate] of pentaerythritol
(3) monoammonium salt from phenylphosphonic acid.

EXAMPLE 74 (COMPARISON EXAMPLE)

By working according to the modalities used in examples from 25 to 52, but using as nitrogenous compound 2,4-diamino-6-hydroxy-1,3,5-triazine, the following composition is prepared:

| | |
|---|---|
| Polypropylene: | 72 parts by weight |
| Antioxidant | 1 part by weight |
| Ammonium polyphosphate | 19.3 parts by weight |
| 2,4-diamino-6-hydroxy-1,3,5-triazine | 7.7 parts by weight |

Using the above specified compositions, specimens have been prepared which have been subjected to self-extinguishing tests according to the previously described modalities.
The following results have been obtained:
L.O.I. =23.8
UL 94 (3 mm): Class B (the specimen burns).

We claim:

1. A self extinguishing polymer composition, comprising:

a) 91-40 parts by weight of a thermoplastic polymer or polymer having elastomeric properties;
b) 6-33 parts by weight of ammonium phosphates, amine phosphates, ammonium phosphonates, amine phosphonates or mixtures thereof;
c) 3-27 parts by weight of a triazine compound having formula I

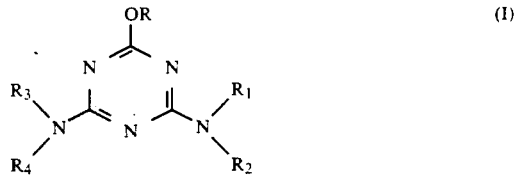

wherein:
(1) R is (a) H, (b) —($C_nH_{2n}$)—X, wherein n=1-8 and X is H, CN, —O—$C_{1-4}$ alkyl, —O—$C_{2-4}$ alkenyl, $C_{6-12}$ cycloalkyl, $C_{6-12}$ alkylcycloalkyl, —O—$C_{6-12}$ aryl, —$NR_5R_5$ wherein said $R_5$ groups are the same or different and are $C_{1-4}$ alkyl, $C_{3-4}$ alkenyl, or said groups $R_5$ together with the nitrogen atom to which they are attached form a heterocyclic ring containing 1-2 heteroatoms, (c) $C_{2-6}$ alkenyl, (d) $C_{6-12}$ cycloalkyl, (e) $C_{6-12}$ alkylcycloalkyl; (f) $C_{6-12}$ aryl or aralkyl;

(2) at least one of $R_1$, $R_2$, $R_3$ or $R_4$ is —($C_mH_{2m}$)—$OR_6$ or —($C_pH_{2p}$)—$NR_7R_7$, wherein m=2-8 and p=2-6;
$R_6$ is H, $C_{1-8}$ alkyl, $C_{2-6}$ alkenyl or —($C_qH_{2q}$)—$OR_8$ wherein q=1-4;
said groups $R_7$ are the same or different and are H, $C_{1-8}$ alkyl, $C_{2-6}$ alkenyl, $C_{1-4}$ hydroxyalkyl, $C_{6-12}$ cycloalkyl, $C_{6-12}$ alkylcycloalkyl or said groups $R_7$ together with the nitrogen atom to which they are attached form a heterocyclic ring containing 1-2 heteroatoms;

$R_8$ is H, $C_{1-4}$ alkyl, $C_{6-12}$ cycloalkyl or $C_{6-12}$ alkylcycloalkyl; and (3) the remaining $R_1$, $R_2$, $R_3$ and $R_4$ groups are the same or different and are H, $C_{1-18}$ alkyl, $C_{2-8}$ alkenyl, $C_{6-16}$ cycloalkyl, $C_{6-16}$ alkylcycloalkyl, $C_{6-16}$ cycloalkyl or $C_{6-16}$ alkylcycloalkyl substituted by OH, $C_{1-4}$ hydroxyalkyl; or (4) $R_1$ and $R_2$ together with the nitrogen atom to which they are attached or $R_3$ and $R_4$ together with the nitrogen atom to which they are attached form a heterocyclic ring containing 1-2 heteroatoms.

2. The polymer composition of claim 1, comprising 8-30 parts by weight of said ammonium phosphates, amine phosphates, ammonium phosphonates, amine phosphonates or mixtures thereof.

3. The polymer composition of claim 1, comprising 4-20 parts by weight of said triazine compound having formula I.

4. The polymer composition of claim 1, wherein X is H, CN, —O—$C_{1-4}$ alkyl, —O—$C_{2-4}$ alkenyl, $C_{6-12}$ cycloalkyl, $C_{6-12}$ alkylcycloalkyl or —$O_{6-12}$ aryl.

5. The polymer composition of claim 1, wherein said group $NR_1R_2$ or said group $NR_3R_4$ is a heterocyclic ring selected from the group consisting of aziridine, pyrrolidine, piperidine, morpholine, thiomorpholine, piperazine, 4-methylpiperazine, 4-ethylpiperazine, 2-methylpiperazine, 2,5-dimethylpiperazine, 2,3,5,6-tetramethylpiperazine, 2,2,5,5-tetramethylpiperazine, 2-ethylpiperazine and 2,5-diethylpiperazine.

6. The polymer composition of claim 1, wherein at least one of $R_1$, $R_2$, $R_3$ or $R_4$ is —$(C_mH_{2m})$—$OR_6$, wherein m=2-4 and $R_6$ is hydrogen or $C_{1-4}$ alkyl.

7. The polymer composition of claim 1, wherein the group $NR_5R_5$ is a heterocyclic ring selected from the group consisting of pyrrolidine, piperidine, morpholine, thiomorpholine, piperazine, 4-methylpiperazine and 4-ethylpiperazine.

8. The polymer composition of claim 1, wherein the group $NR_7R_7$ is a heterocyclic ring selected from the group consisting of aziridine, pyrrolidine, piperidine, morpholine, thiomorpholine, piperazine, 4-methylpiperazine and 4-ethylpiperazine.

9. The polymer composition of claim 1, wherein R is H.

10. The polymer composition of claim 1, wherein R is —$(C_nH_{2n})$—X, n=1-4 and X is H.

11. The polymer composition of claim 1, wherein said ammonium phosphate has the formula $(NH_4)_{n+2}P_nO_{3n+1}$, wherein n is an integer equal to or greater than 2.

12. The polymer composition of claim 1, wherein said ammonium phosphate has the formula $(NH_4PO_3)_n$ wherein n is an integer between 50-500.

13. The polymer composition of claim 1, wherein said amine phosphate is selected from the group consisting of dimethylammonium phosphate, diethylammonium phosphate, ethylenediamine phosphate, melamine orthophosphate and melamine pyrophosphate.

14. The polymer composition of claim 1, wherein said ammonium phosphonate is a monosubstituted or polysubstituted phosphonic acid salt.

15. The polymer composition of claim 1, wherein said thermoplastic polymer or polymer having elastomeric properties is selected from the group consisting of polyolefins having monomer units derived from olefins having the formula R—CH=$CH_2$, wherein R is H, $C_{1-8}$ alkyl or aryl.

16. The polymer composition of claim 1, wherein said thermoplastic polymer or a polymer having elastomeric properties is selected from the group consisting of acrylonitrile/butadiene/styrene copolymers, styrene/acrylonitrile copolymers, polyurethanes, polyethylene terephthalates, polybutylene terephthalates and polyamides.

17. The polymer composition of claim 1, wherein said thermoplastic polymer or polymer having elastomeric properties is selected from the group consisting of (a) isotatic polypropylene, substantially isotatic polypropylene, (b) high density polyethylene, low density polyethylene, linear low density polyethylene, (c) crystalline copolymers of propylene with ethylene, alpha-olefins other than ethylene, or mixtures thereof, (d) heterophasic polymer compositions comprising (A) homopolymeric polypropylene or said crystalline propylene copolymer (c) and (B) a copolymeric fraction consisting of elastomeric copolymers of ethylene and an alpha-olefin other than ethylene, and (e) elastomeric copolymers of ethylene, alpha-olefins other than ethylene and a diene.

18. The polymer composition of claim 17, wherein said alpha-olefin in said crystalline propylene copolymer (c) is selected from the group consisting of 1-butene, 1-hexene, 1-octene and 4-methyl-1-pentene.

19. The polymer composition of claim 17, wherein said alpha-olefin in said heterophasic composition (d) is propylene or 1-butene.

20. The polymer composition of claim 17, wherein said elastomeric copolymers (B) of ethylene and alpha-olefin further comprise a diene.

21. A molded article comprising the polymer composition of claim 1.

* * * * *